UNITED STATES PATENT OFFICE.

N. T. WINANS, THEODORE HYATT, AND THADDEUS HYATT, OF NEW YORK, N. Y.

IMPROVEMENT IN THE COMPOSITION OF MATTER FOR THE MANUFACTURE OF FRICTION-MATCHES.

Specification forming part of Letters Patent No. 2,403, dated December 23, 1841.

*To all whom it may concern:*

Be it known that we, NORMAN T. WINANS, THEODORE HYATT, and THADDEUS HYATT, of the city of New York, in the State of New York, have invented a new and Improved Mode of Making an Inflammable Composition for the Manufacturing of Friction-Matches, which composition has the property of not being injuriously affected by hygrometric changes of the atmosphere; and we do hereby declare that the following is a full and exact description thereof.

In forming the composition, which is to be ignited by friction, we use a solution of shellac made by the agency of water and borax, which we combine with phosphorus, and thus produce a compound which does not require the admittance of any earthy substance to give it consistency or body, which possesses the requisite degree of inflammability, and which can be obtained at a price admitting of its being economically employed. In making this solution we ordinarily proceed in the following manner: We take three parts, by weight, of shellac, three-fourths of a part of the subborate of soda, known in commerce under the name of "borax," and to this we add water sufficient to dissolve and give a proper consistency to the mass. These materials we put into a mortar or other suitable vessel, which we place in a hot bath, by which the solution of the resin will be effected. We then add three-fourths of a part of phosphorus and stir or triturate the mass until the phosphorus has entirely combined with it. The solution is then ready to be applied to the ends of the prepared splints or other article of which the matches are to be formed.

We had long since essayed the use of spirituous solutions of shellac and other resins, in combination with phosphorus, in the making of friction-matches, but were induced to abandon their use partly from the inflammability of the solution, by which its employment was not unattended with danger, partly from the expense of the solution itself, but particularly from the fact of its requiring so great a length of time to dry as to render necessary double the number of dipping-machines and twice the amount of room in the manufacture, thus adding so greatly to the cost as to render it impossible to conduct the manufacture with that economy which would be beneficial to the manufacturers and consumers.

With the compound above named no absorbent material is needed for the purpose of giving body to the mass or resisting hygrometric changes of the atmosphere, as is the case where gelatine or gum has been the adhesive matter used in solution with phosphorus, for the resin itself affords sufficient body, and is in its own nature decidedly anti-hygrometric. The only use which we ever make of earthy material in this combination is for the purpose of coloring or to keep the resinous solution from scumming while we are applying the sticks to the composition. Powdered gums or resins do not accomplish this object; and the reason why an aqueous solution of lac can be employed practically while an alcoholic or terebinthic solution cannot is because of its ability to bear a proper admixture of foreign material without destroying its consistency.

Having thus fully described the nature of our improvement in preparing the ignitible compound for friction-matches, we do hereby declare that we do not mean to limit or confine ourselves to the precise proportions of the respective ingredients used by us, as this may be varied to some extent without changing the nature of our improvement; nor do we claim the using of a solution of shellac or other resin as a part of this compound when such solution is made by means of alcohol or spirits of turpentine; but we limit our claim to the employment of an aqueous solution of the resin made by the agency of an alkali or the salts of an alkali, prepared as above described, in combination with phosphorus, substantially in the manner and for the purpose herein fully made known.

NORMAN T. WINANS.
THEODORE HYATT.
THADDEUS HYATT.

Witnesses:
EDWIN J. WELLER,
WM. B. AITKEN.